United States Patent

Jungbeck

[15] 3,641,853
[45] Feb. 15, 1972

[54] PROCESS AND APPARATUS FOR THE CUTTING OF MATERIAL

[72] Inventor: Manfred Jungbeck, Plettenberg, Germany
[73] Assignee: Kallwalzwerke Brockhaus GmbH, Plettenberg, Bahnhof, Germany
[22] Filed: Feb. 10, 1969
[21] Appl. No.: 797,743

[30] Foreign Application Priority Data

Oct. 31, 1968 Germany .................... P 18 06 305.3

[52] U.S. Cl. .................................. 83/7, 83/9, 83/51, 83/503
[51] Int. Cl. ................................. B26d 3/08, B23d 19/04
[58] Field of Search .................. 83/7, 8, 9, 500, 503, 169, 83/51; 225/3

[56] References Cited

UNITED STATES PATENTS

| | | | |
|---|---|---|---|
| 2,053,375 | 9/1936 | Nicholas | 225/3 |
| 2,109,921 | 3/1938 | Leach | 83/169 X |
| 2,609,049 | 9/1952 | Rayburn | 225/3 X |
| 2,508,758 | 5/1950 | Hollerith | 83/51 |
| 224,827 | 2/1880 | Hewitt | 83/51 |

*Primary Examiner*—Andrew R. Juhasz
*Assistant Examiner*—Leon Gilden
*Attorney*—Burgess, Dinklage & Sprung

[57] ABSTRACT

In the cutting of material to sever a first part thereof from second part thereof along a path in the material, the steps of a. offsetting by shearing said first part from said second part along with said path, to only partially cut said first part from said second part, and to displace said first part in elevation from said second part, and thereafter b. cutting said first part from said second part to sever the first and second parts by shearing along said path to displace said first part in elevation from the second part in the direction opposite to the displacement of said first and second parts effected in step (a).

The process, and also apparatus for practicing the process are claimed.

9 Claims, 7 Drawing Figures

PATENTED FEB 15 1972 3,641,853

Inventor:
Manfred Jungbeck
by: Burgess, Dinklage & Sprung
Attorneys

3,641,853

PROCESS AND APPARATUS FOR THE CUTTING OF MATERIAL

BACKGROUND

The invention relates to a process and an apparatus for the cutting of material, e.g., flat material such as flat rolled sheets, by means of a shear.

In the known method of cold-cutting flat rolled material, the material is severed in a single cutting action. A prior art apparatus for cold cutting consists of an upper and a lower rotating knife wheel, between which the material is cut as it passes. In this kind of cutting action a bur is produced on the edge opposite the cut edge of the material.

It is the object of the invention to develop a process, as well as an apparatus for performing the process, for the cold cutting of material, especially flat material, e.g., flat rolled metal, such as steel, sheet, in which such a bur is not produced.

THE INVENTION

According to the invention, the material is cut with a shear from one side only to a portion of its thickness, and then is severed from the other side by a shear operating in the reverse direction.

Thus, material is severed into a first part and a second part in two steps. In the first step, the first part is offset from the second part along the cutting path, to only partially cut the first part from the second part, and to displace the first part in elevation from the second part. In the second step, the first part is cut from the second part to sever the first part and the second part by shearing along the cutting path to displace said first part in elevation from the second part in the direction opposite to the displacement of the first and second parts effected in step ($a$).

An apparatus that is suitable for the performance of the above process is characterized in that successive shears are arranged in the direction of transport of the material, each of which comprises two circular disks which are parallel to one another, which are located close to one another, and which are mounted on rotating shafts whose distance apart, in the case of the first shear that can operate in the direction of the transport of the material, is so great that the margins of the disks are spaced from one another radially by an amount that is smaller than the thickness of the material to be cut, and whose distance apart, in the case of the other shear, is so slight that the margins of the disks overlap or nearly overlap one another in the radial direction, and that the disks of the first shear are arranged inversely (compare FIG. 4 and FIG. 5) to the disks of the second shear.

Thus, the apparatus according to the invention comprises a first pair and a second pair of rotatable, cooperating, shearing disks (FIG. 1). The first pair and second pair of shearing disks are disposed in alignment for cutting the material in succession by, respectively, said first and second pair of shearing disks, along a single path in the material. The radially outwardly disposed edge portions of the disks of said first pair of disks are in radially spaced relation, for cutting to a depth less than the thickness of the material by displacement of the first part of the material relative to the second part of the material. The radially outwardly disposed edge portions of the disks of the second pair of disks, is disposed to displace the first and second parts of the material in the opposite direction to a depth sufficient to sever the first and second parts.

Preferably, to permit cutting of opposite edge portions of material simultaneously, a third and fourth pair of shearing disks are provided, and are, respectively, axially spaced from and parallel to the first and second shears, the disks of said third and fourth shear pairs being arranged in relation to one another the same as the disks of the first two shears.

It is advantageous for the disks of the shears to overlap in the direction of transport of the material, since the overlapping of the disks eliminates the necessity of axial guidance of the rear pair of shafts in the direction of transport of the material.

Preferably all of the shafts are driven, thereby preventing any slippage between the cutting edges and the band, which might result in premature wearing out of the cutters.

Another embodiment, however, is characterized in that at least one pair of shafts forming a shear does not have its own drive. In this case, the diameter of the disks can be freely selected in the case of the nondriven pair of shafts. If the shafts of both shears were driven and the diameter of the disks of one of the shears differed from the diameter of the disks of the other of the shears, synchronizing means would be required. Furthermore, free play in the driving elements of the shaft pairs would not prove disadvantageous.

Embodiments of the invention are explained hereinafter with reference to the drawings, in which.

Figure 1:
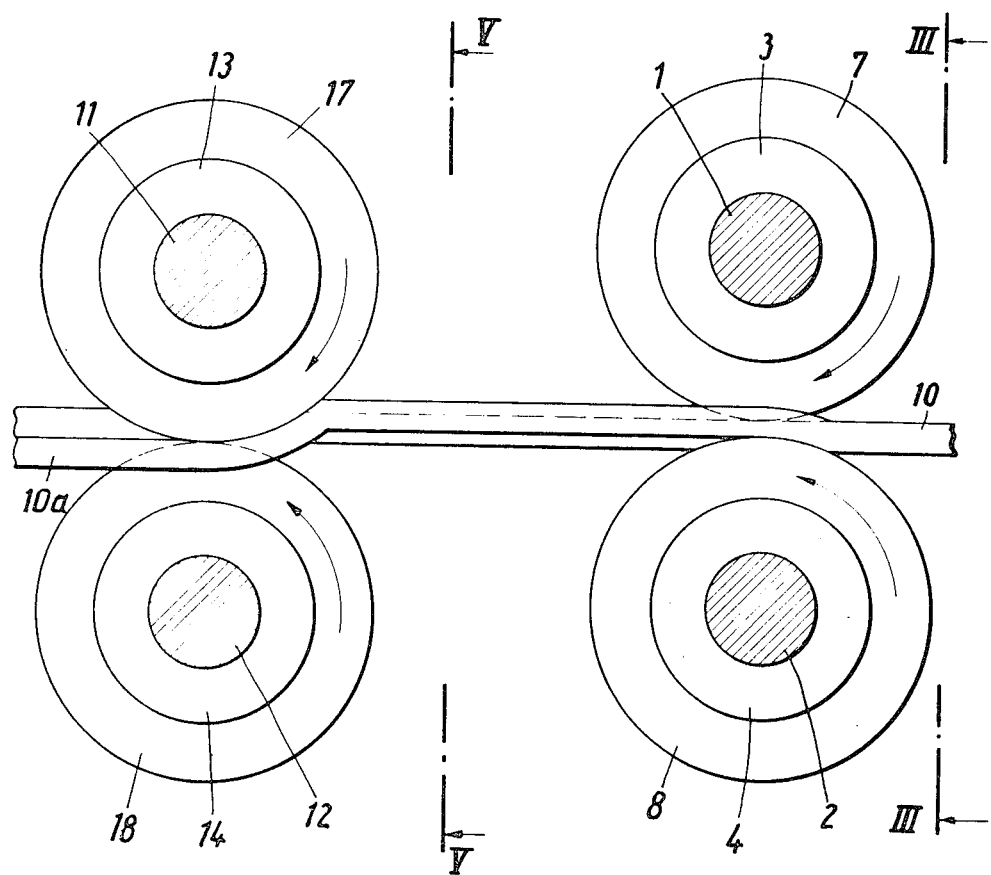
FIG. 1 is a side elevation of an apparatus according to the invention.
Figure 3:
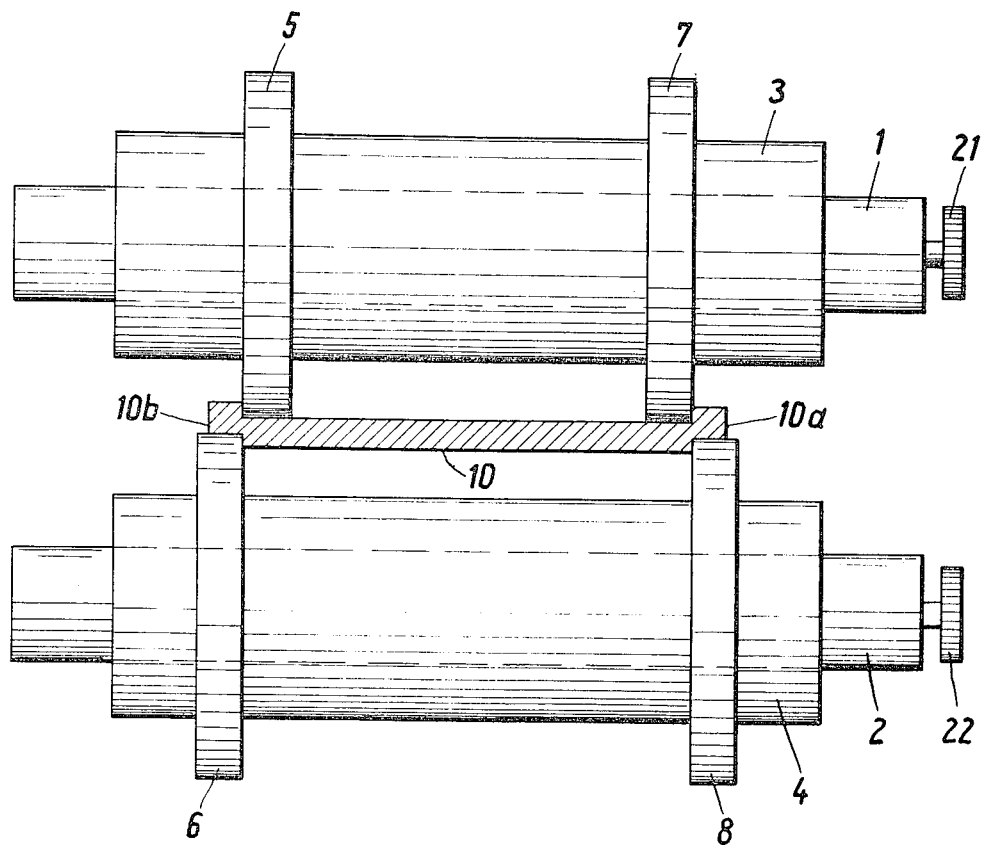
FIG. 3 is a section in the direction of the arrows on line III—III of FIG. 1.
Figure 5:
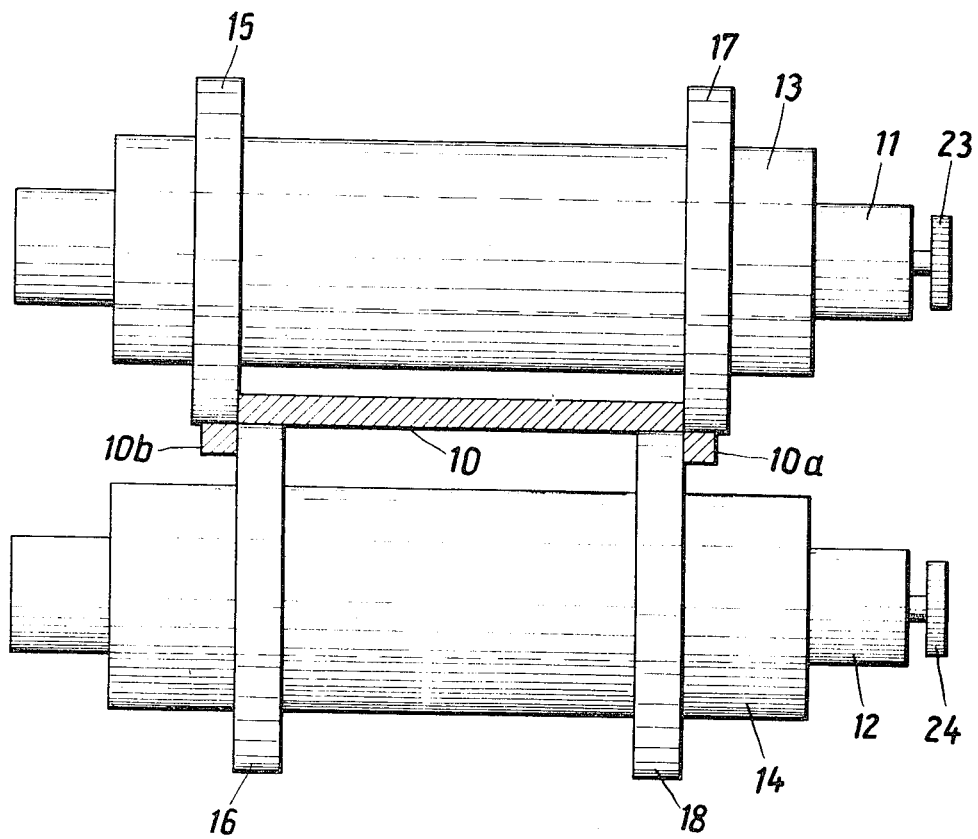
FIG. 5 is a section in the direction of the arrows on line V—V of FIG. 1.

In the arrangement of the apparatus shown in FIG. 1, there are four rotatable shafts parallel to one another, 1, 2 and 11, 12. The shafts 1, 2, 11 and 12 are provided, respectively, with drive means 21, 22, 23 and 24. As can be seen in FIG. 3 and FIG. 5, the shafts carry cylindrical bodies 3, 4 and 13, 14. Spaced cutting disks or shear wheels 5, 7, 6, 8 and 15, 17, 16, 18, which have cylindrical outer surfaces, are mounted on the cylindrical bodies. The arrangement of the shearing disks is such that disk 5 of shaft 1 forms a shear with disk 6 of shaft 2, and disk 7 of shaft 1 forms a shear with disk 8 of shaft 2. The disposition of disks 16, 15 and 17, 18 of shafts 11 and 12 is the same. A steel band 10 is moving between the shear disks, and its marginal strips 10a and 10b extend beyond the cutting edges of the shear disks. The shear shafts 1, 2 and 11, 12 are guided axially by antifriction bearings (not represented).

Figure 2:
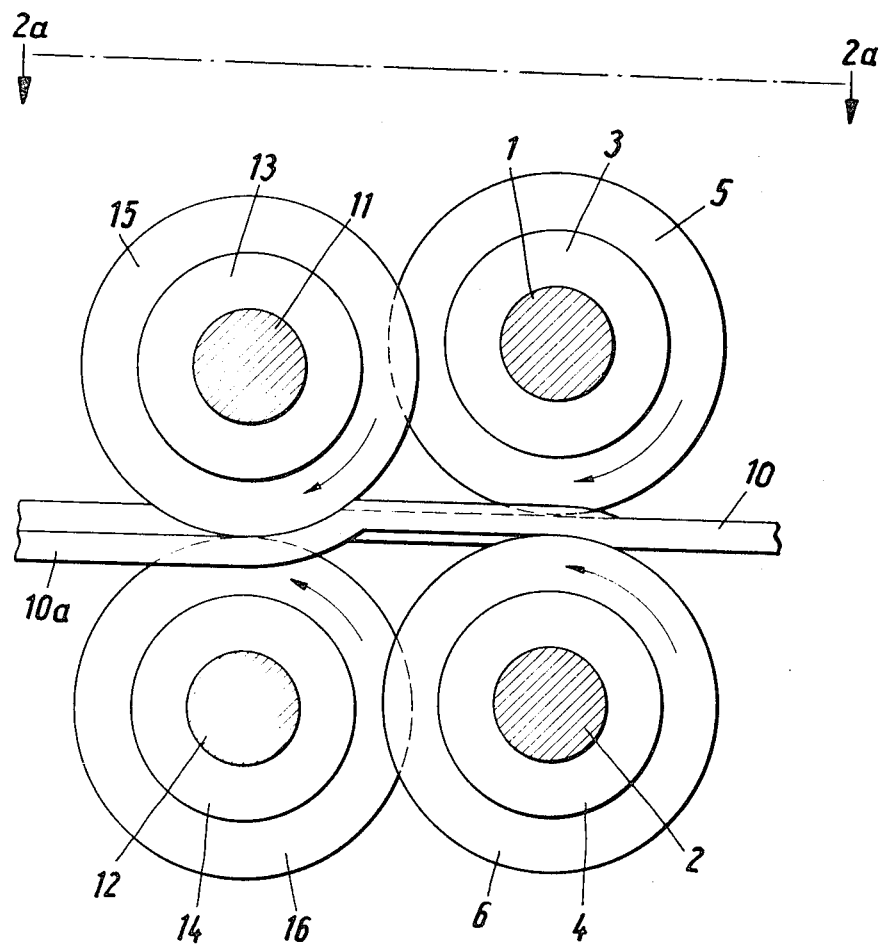
FIG. 2 is a side elevation of the apparatus with partially overlapping shears.
Figure 2A:
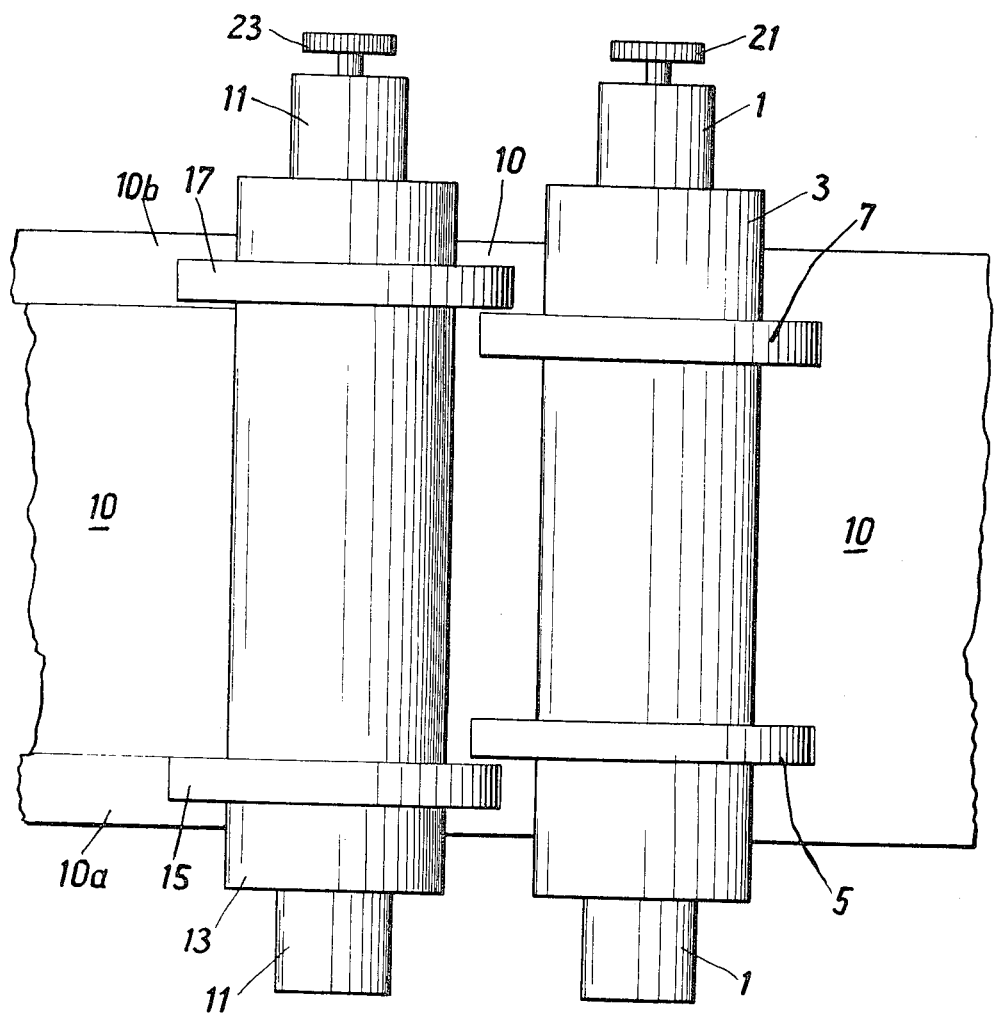
FIG. 2a is a plan view taken along line 2a—2a in FIG. 2.

FIG. 2 and FIG. 2a represent another arrangement of the apparatus, wherein the shear shafts 1, 2, on which disks 5, 7 are mounted, and 11, 12 are arranged so close to one another that the shear disks 5, 6 and 7, 8 of shafts 1 and 2 overlap the shear disks 15, 16 and 17, 18 of shafts 11 and 12. The aligned upper disks and the aligned lower disks overlap preventing axial movement of the shafts. The advantage of this arrangement consists in the fact that no precise axial guidance of the second pair of shafts 11, 12 is needed, since the guidance of the second pair of shafts 11, 12 is provided by the overlapping of the shear disks.

In both arrangements, either all four shafts can be driven, or only one pair of shafts, in which case the other pair of shafts idles. If all shear shafts are driven, the assurance is given that no slipping will occur between the cutting edges and the band, thereby preventing excessive shear wear. If one pair of shafts is not driven, freedom is achieved in the selection of the diameter of the shear disks on this pair of shafts. Furthermore, any free play between the driving members of the first shaft pair and the second will have no adverse effect. Furthermore, the possibility also exists of not driving any of the pairs of shafts. In this case the actual cutting power will be provided by the pull of the winder, unless a band pulling system is used.

Figure 4:
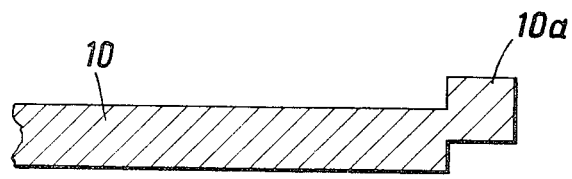
FIG. 4 represents the scored marginal strip of the steel band of FIG. 3, on an enlarged scale.

FIG. 3 shows the first shaft air 1, 2 of the apparatus. The shear disks 5, 7 and 6, 8 are so adjusted that the radial distance between their cutting edges is smaller than the thickness of the material to be cut, and the disks 5, 7 and 6, 8 are so arranged that their cutting edges are constituted by the outside edge of disks 5 and 7 and the inside edges of disks 6 and 8. In the case of the second pair of rolls 11, 12 of the apparatus, which is represented in FIG. 5, the arrangement of disks 15, 17 and 16, 18 are so adjusted that their cutting edges are approximately at the same height. As is apparent from FIG. 3, the discs of each pair are axially offset with respect to each other. Thus, as shown in FIG. 4, discs 5 and 6 are so related.

The two-step process will now be further described with the aid of FIGS. 3 to 6.

Figure 6:
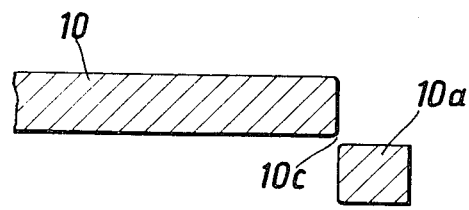
FIG. 6 shows the steel band of FIG. 5 with the severed marginal strip, on an enlarged scale.

FIG. 3 shows the first step of the process, in which the rolled material, e.g., a steel band 10, is introduced between the first pair of shafts 1, 2 and is cut to a depth of about 30 to 50 percent of its thickness from underneath by the shear disks 5, 7 and 6, 8. FIG. 4 shows the marginal strip 10a of the steel band 10 that has thus been scored, on a larger scale. Then the steel band 10 runs with its scored marginal strip between the following sets of disks 15, 17 and 16, 18 of shaft pair 11, 12, where, in the second step of the process, represented in FIG. 5, it is cut all the way through from the upper side to the lower. FIG. 6 represents on an enlarged scale the bur-free cut edges of the steel band 10 and a severed marginal strip 10a.

Owing to the fact that, in the first stop, a cut is made from one side only to a portion of the material thickness and then a second, severing cut is made from the other side, the assurance is given that the two opposite cut edges are smoothed by the drawing over of the material, and that the severance occurs more towards the center of the material cross section, not at the edge opposite the cut edge, which unfailingly results in the formation of a bur.

In the known cutting process, by cutting by shearing in a single step, referring to FIG 6, strip 10a from band 10, by displacing strip 10a downwardly with respect to band 10, a bur is left along edge 10c. By the process of the invention, the cutting is effected without the formation of the bur.

Thus, referring to FIG. 3 and FIG. 5, according to the invention a flat material in the form of steel band 10 having a first or upper extended surface on one side thereof, and, on the opposite side thereof, a second or lower extended surface, is cut by shearing. First, the material is passed between the rolls of FIG. 3 and is sheared from the upper extended surface to only a portion of the thickness of the material. Thereafter, as a second step, the material is passed between the rolls of FIG. 5, and is sheared from said lower extended surface to complete the cut.

I claim:

1. Apparatus for cutting material to sever a first part thereof from a second part thereof, comprising:
   a. a fist pair and a second pair of rotatable, cooperating, shearing disks, the discs of each pair being axially offset with respect to each other;
   b. said first pair and second pair of shearing disks being disposed in alignment for cutting by shearing the material in succession by, respectively, said first and second pair of shearing disks, along a single path in the material, c. the radially outwardly disposed edge portions of the disks of said first pair of disks being in radially spaced relation for cutting to a depth less than the thickness of the material by displacement of said first part of the material relative to the second part thereof,
   d. the radially outwardly disposed edge portions of the disks of said second pair of disks being disposed to displace said first and second parts in the opposite direction to a depth sufficient to sever said first and second parts.

2. Apparatus according to claim 1, the radially outwardly disposed edge portions of the disks of said second pair of disks substantially overlapping.

3. Apparatus according to claims 1, and a third and fourth pair of rotatable, cooperating shearing disks, and said third and fourth pair of disks being disposed relative to each other as said first and second disks are disposed relative to each other, and being spaced from and parallel to, respectively, the first and second pair of disks, whereby opposite edge portions can be simultaneously cut from said material.

4. Apparatus according to claims 1 and means for driving each of said disks.

5. Apparatus according to claims 1, and means for driving the disks of only one of said first and second pairs.

6. Apparatus according to claim 3, each of said pairs of disks including an upper disk and a lower disk, the upper disks of the first pair and third pair being mounted on a first common shaft, the lower disks of the first pair and third pair being mounted on a second common shaft, the upper disks of the second and fourth pair being mounted on a third common shaft, and the lower disks of the second and fourth pair being mounted on a fourth common shaft, the aligned upper disks and the aligned lower disks overlapping preventing axial movement of the shafts.

7. Apparatus according to claim 3, each of said pair of disks including an upper disk and a lower disk, the upper disks of the first pair and third pair being mounted on a first common shaft, the lower disks of the first pair and second pair being mounted on a second common shaft, the upper disks of the second and fourth pair being mounted on a third common shaft, and the lower disks of the second and fourth pair being mounted on a fourth common shaft, and means for driving each of said shafts.

8. Apparatus according to claim 3, each of said pairs of disks including an upper disk and a lower disk, the upper disks of the first pair and third pair being mounted on a first common shaft, the lower disks of the first pair and third pair being mounted on a second common shaft, the upper disks of the second and fourth pair being mounted on a third common shaft, and the lower disks of the second and fourth pair being mounted on a fourth common shaft, and means for driving only the first and second common shafts or the third and fourth common shaft.

9. Apparatus according to claim 1, the outer surfaces of the shearing discs being cylindrical.

* * * * *

PO-1050
(5/69)

UNITED STATES PATENT OFFICE
CERTIFICATE OF CORRECTION

Patent No. 3,641,853             Dated February 15, 1972

Inventor(s) Manfred Jungbeck

It is certified that error appears in the above-identified patent and that said Letters Patent are hereby corrected as shown below:

In the summary, which is the first page of the patent, [73], Assignee, change "Kallwalzwerke" to --Kaltwalzwerk--.

Signed and sealed this 28th day of November 1972.

(SEAL)
Attest:

EDWARD M. FLETCHER, JR.
Attesting Officer

ROBERT GOTTSCHALK
Commissioner of Patents